(12) United States Patent
Liu et al.

(10) Patent No.: US 10,212,544 B2
(45) Date of Patent: Feb. 19, 2019

(54) METHOD FOR DELETING PUSH INFORMATION, SERVER AND TERMINAL DEVICE

(71) Applicant: Alibaba Group Holding Limited, Grand Cayman (KY)

(72) Inventors: Shuyan Liu, Zhejiang (CN); Tian Zhang, Zhejiang (CN)

(73) Assignee: Alibaba Group Holding Limited

( * ) Notice: Subject to any disclaimer, the term of this patent is extended or adjusted under 35 U.S.C. 154(b) by 0 days.

(21) Appl. No.: 15/601,389

(22) Filed: May 22, 2017

(65) Prior Publication Data

US 2017/0257740 A1   Sep. 7, 2017

Related U.S. Application Data

(63) Continuation of application No. PCT/CN2015/095585, filed on Nov. 26, 2015.

(30) Foreign Application Priority Data

Dec. 2, 2014   (CN) .......................... 2014 1 0724825

(51) Int. Cl.
*H04L 12/58*   (2006.01)
*G01S 5/02*   (2010.01)
(Continued)

(52) U.S. Cl.
CPC .............. *H04W 4/022* (2013.01); *G01S 5/02* (2013.01); *H04L 51/20* (2013.01); *H04L 67/18* (2013.01);
(Continued)

(58) Field of Classification Search
CPC ... H04W 4/022; H04W 4/021; H04W 68/005; H04W 4/023; H04L 67/18; H04L 67/10; H04L 67/22; H04L 67/26; G01S 5/14
(Continued)

(56) References Cited

U.S. PATENT DOCUMENTS

| 8,509,822 B1 * | 8/2013 | Hou ........................ H04W 4/02 342/357.4 |
| 8,977,284 B2 * | 3/2015 | Reed ....................... H04W 8/02 455/404.2 |

(Continued)

FOREIGN PATENT DOCUMENTS

| CN | 102387215 A | 3/2012 |
| CN | 102800003 | 11/2012 |

(Continued)

OTHER PUBLICATIONS

Translation of International Search Report from corresponding PCT application No. PCT/CN2015/095585 dated Feb. 25, 2016, 2 pages.

(Continued)

*Primary Examiner* — Marceau Milord

(74) *Attorney, Agent, or Firm* — Lee & Hayes, P.C.

(57) ABSTRACT

A method, a server, and a terminal device of deleting a piece of push information are disclosed. The method includes: determining geographical location information of a terminal device; determining, according to the geographical location information and a preset database, whether the terminal device enters a regional range corresponding to a place, and if affirmative, pushing a piece of information related to the place to the terminal device, the database storing regional range information of each place and related pieces of information; and after determining that the terminal device leaves the regional range corresponding to the place, sending an instruction of deleting the piece of push information to the terminal device, so that the terminal device deletes the piece of push information. According to the embodiments of the present disclosure, interference caused by pieces of push information to the daily life of users can be avoided.

20 Claims, 12 Drawing Sheets

(51) Int. Cl.
*H04W 4/12* (2009.01)
*H04L 29/08* (2006.01)
*H04W 4/021* (2018.01)
*G01S 5/14* (2006.01)
*H04W 4/02* (2018.01)
*H04W 68/00* (2009.01)

(52) U.S. Cl.
CPC ............ *H04W 4/021* (2013.01); *H04W 4/12* (2013.01); *G01S 5/14* (2013.01); *H04L 67/10* (2013.01); *H04L 67/22* (2013.01); *H04L 67/26* (2013.01); *H04W 4/023* (2013.01); *H04W 68/005* (2013.01)

(58) Field of Classification Search
USPC .............................. 455/412.1, 456.1, 404.2
See application file for complete search history.

(56) References Cited

U.S. PATENT DOCUMENTS

| | | | | |
|---|---|---|---|---|
| 9,489,787 | B1* | 11/2016 | Ives-Halperin | G06Q 10/02 |
| 9,510,320 | B2* | 11/2016 | Reed | H04W 8/02 |
| 9,642,024 | B2* | 5/2017 | Reed | H04W 24/02 |
| 9,918,196 | B2* | 3/2018 | Reed | H04W 4/023 |
| 2003/0134648 | A1* | 7/2003 | Reed | H04W 60/00 |
| | | | | 455/456.1 |
| 2008/0045234 | A1* | 2/2008 | Reed | H04W 8/02 |
| | | | | 455/456.1 |
| 2009/0241040 | A1* | 9/2009 | Mattila | G06F 3/0481 |
| | | | | 715/760 |
| 2012/0008526 | A1* | 1/2012 | Borghei | H04W 4/021 |
| | | | | 370/254 |
| 2015/0341435 | A1* | 11/2015 | Hamada | H04L 67/1078 |
| | | | | 709/205 |
| 2016/0071325 | A1* | 3/2016 | Callaghan | G06T 19/006 |
| | | | | 345/633 |
| 2016/0080943 | A1* | 3/2016 | Ives-Halperin | G06Q 10/02 |
| | | | | 713/168 |
| 2016/0086228 | A1* | 3/2016 | Babb | G06Q 30/0267 |
| | | | | 705/14.64 |
| 2016/0253710 | A1* | 9/2016 | Publicover | H04W 4/21 |
| | | | | 705/14.66 |
| 2017/0076522 | A1* | 3/2017 | Ives-Halperin | G06Q 10/02 |

FOREIGN PATENT DOCUMENTS

| | | |
|---|---|---|
| CN | 103078786 | 5/2013 |
| CN | 103297327 | 9/2013 |
| CN | 104105061 | 10/2014 |
| KR | 20120100085 | 9/2012 |

OTHER PUBLICATIONS

Translation of Written Opinion from corresponding PCT application No. PCT/CN2015/095585 dated Feb. 25, 2016, 6 pages.
Chinese Office Action for Chinese Patent Application No. 201410724825.8, dated May 21, 2018, a counterpart foreign application of U.S. Appl. No. 15/601,389, 16 pages.

* cited by examiner

METHOD FOR DELETING PUSH INFORMATION, SERVER AND TERMINAL DEVICE

CROSS REFERENCE TO RELATED PATENT APPLICATIONS

This application claims priority to and is a continuation of PCT Patent Application No. PCT/CN2015/095585, filed on 26 Nov. 2015, which is related to and claims priority to Chinese Patent Application No. 201410724825.8, filed on 2 Dec. 2014, entitled "Method for Deleting Push Message, Server and Terminal Device," which is hereby incorporated by reference in its entirety.

TECHNICAL FIELD

The present disclosure relates to the field of information pushing technologies, and in particular, to methods, servers, and terminal devices for deleting push information.

BACKGROUND

In daily life, when entering a place, people usually receive some push information, such as promotion activity information related to a shopping mall, which is related to the place. Such push information has a positive effect to a great extent, having a reference value in decision-making of a user, for example. However, from another perspective, such push information may have some negative effects on the users. For example, with an increasing number of push scenarios, a user may receive increasingly more push information, in which only a few pieces of information may be truly useful to the user, while the others may be regarded as harassment information and cause inconvenience to the user. When the user needs to search for desired information from an information list, for example, interference may be caused by these pieces of push information.

Therefore, how to control push information more effectively to make use of its positive effects while minimizing its negative effects has become a technical problem to be solved by one skilled in the art.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

The present disclosure provides a method, a server, and a terminal device for deleting a piece of push information, to avoid interference caused by such information in a daily life of a user.

The present disclosure provides solutions as follows.

In implementations, a method of deleting a piece of push information may include determining geographical location information of a terminal device; determining whether the terminal device enters a regional range corresponding to a place based on the geographical location information and a preset database, and pushing a piece of information related to the place to the terminal device to cause the terminal device to prompt the related piece of information if affirmative, wherein the database stores regional range information of each place and respective related pieces of information; and sending an instruction of deleting the piece of push information to the terminal device to cause the terminal device to delete the piece of push information, in response to determining that the terminal device leaves the regional range corresponding to the place.

In implementations, a method of deleting a piece of push information may include determining geographical location information of a terminal device; determining whether the terminal device enters a regional range corresponding to a place based on the geographical location information and a preset database, and pushing a piece of information related to the place to the terminal device to cause a first application of the terminal device to prompt the related piece of information if affirmative, wherein the database stores regional range information of each place and respective related pieces of information; and sending an instruction of deleting the piece of push information to the terminal device to cause the first application of the terminal device to delete the piece of push information, in response to determining that the terminal device leaves the regional range corresponding to the place.

In implementations, a method of controlling a piece of push information may include receiving a piece of information that is pushed from a server terminal by a terminal device, the piece of push information being related to a place where the terminal device is currently located; and deleting the piece of push information in response to receiving an instruction of deleting the piece of push information sent by the server terminal, the instruction being sent by the server after determining that the terminal device has left the place.

In implementations, a method of deleting a piece of push information may include receiving a piece of information that is pushed from a server terminal by a first application of a terminal device, the piece of push information being related to a place where the terminal device is currently located; and deleting the piece of push information in response to receiving an instruction of deleting the piece of push information sent by the server terminal, the instruction being sent by the server after determining that the terminal device has left the place.

In implementations, a method of deleting a piece of push information may include receiving and locally storing a piece of information to be pushed from a server by a terminal device in advance, the piece of information including a regional range attribute; determining geographical location information of the terminal device; determining whether the terminal device enters a regional range corresponding to the piece of information based on the geographical location information, and prompting the piece of information if affirmative; and deleting the piece of information in response to determining that the terminal device has left the regional range corresponding to the piece of information.

In implementations, a method of deleting a piece of push information may include receiving and locally storing a piece of information to be pushed from a server by a first application of a terminal device in advance, the piece of information including a regional range attribute; determining geographical location information of the terminal device; determining whether the terminal device enters a regional range corresponding to the piece of information based on the geographical location information, and prompting the piece of information if affirmative; and deleting the piece of information in response to determining that the terminal device has left the regional range corresponding to the piece of information.

A piece of information, which includes a regional range attribute, is pushed to a user terminal device which enters a regional range, and the piece of push information is deleted after the terminal device leaves the regional range.

In implementations, a server of deleting a piece of push information may include a first geographical location information determining unit configured to determine geographical location information of a terminal device; a first information pushing unit configured to determine whether the terminal device enters a regional range corresponding to a place according to the geographical location information and a preset database, and push a piece of information related to the place to the terminal device to cause prompting the related piece of information if affirmative, wherein the database stores regional range information of each place and related pieces of information; and a first deletion instruction sending unit configured to send an instruction of deleting the piece of push information to the user terminal device to cause the terminal device to delete the piece of push information, after determining that the terminal device leaves the regional range corresponding to the place.

In implementations, a server of deleting a piece of push information may include a second geographical location information determining unit configured to determine geographical location information of a terminal device; a second information pushing unit configured to determine whether the terminal device enters a regional range corresponding to a place according to the geographical location information and a preset database, and push a piece of information related to the place to the terminal device to cause a first application in the terminal device to prompt the related piece of information if affirmative, wherein the database stores regional range information of each place and related pieces of information; and a second deletion instruction sending unit configured to send an instruction of deleting the piece of push information to the terminal device to cause the first application in the terminal device to delete the piece of push information after determining that the terminal device leaves the regional range corresponding to the place.

In implementations, a terminal device of deleting a piece of push information may include a push information receiving unit configured to receive a piece of information pushed by a server terminal, the piece of push information being related to a place where the terminal device is currently located; and a deleting unit configured to delete the piece of push information in response to receiving an instruction of deleting the piece of push information sent by the server terminal, the instruction being sent by the server after determining that the terminal device has left the place.

In implementations, a terminal device of deleting a piece of push information may include a first application module, the first application module including a push information receiving sub-module configured to receive a piece of information pushed by a server terminal, the piece of push information being related to a place where the terminal device is currently located; and a deleting sub-module configured to delete the piece of push information when an instruction of deleting the piece of push information sent by the server terminal is received, the instruction being sent by the server after determining that the terminal device has left the place.

In implementations, a terminal device of deleting a piece of push information may include a to-be-pushed information receiving unit configured to receive and locally store a piece of information to be pushed by a server in advance, the piece of information including a regional range attribute; a location determining unit configured to determine geographical location information of the terminal device; an information prompting unit configured to determine whether the terminal device enters a regional range corresponding to the piece of information based on the geographical location information, and prompt the piece of information if affirmative; and a piece of information deleting unit configured to delete the piece of information in response to determining that the terminal device has left the regional range corresponding to the piece of information.

In implementations, a terminal device of deleting a piece of push information may include a second application module, the second application module including a to-be-pushed information receiving sub-module configured to receive and locally store a piece of information to be pushed by a server at the terminal device, the piece of information including a regional range attribute; a location determining sub-module configured to determine geographical location information of the terminal device; an information prompting sub-module configured to determine, whether the terminal device enters a regional range corresponding to the piece of information based on the geographical location information, and prompt the piece of information if affirmative; and an information deleting sub-module configured to delete the piece of information after determining that the terminal device has left the regional range corresponding to the piece of information.

According to exemplary embodiments provided by the present disclosure, the present disclosure discloses the following technical effects.

According to the embodiments of the present disclosure, information related to a place may be pushed to a mobile terminal device upon detecting that a user enters a regional range of the place, and the previously push information may be regarded as invalid or expired information, and is deleted from the user terminal device after detecting that the user has left the place, thereby avoiding interference caused by such information to the daily life of the user.

Apparently, any product implementing the present disclosure does not need to achieve all the aforementioned advantages.

BRIEF DESCRIPTION OF THE DRAWINGS

In order to describe the embodiments of the present disclosure more clearly, drawings to be used for describing the embodiments are briefly described herein. Apparently, the described drawings represent merely some embodiments of the present disclosure, and other drawings can be obtained according to these drawings by one of ordinary skill in the art without making any creative effort.

DETAILED DESCRIPTION

Figure 1:
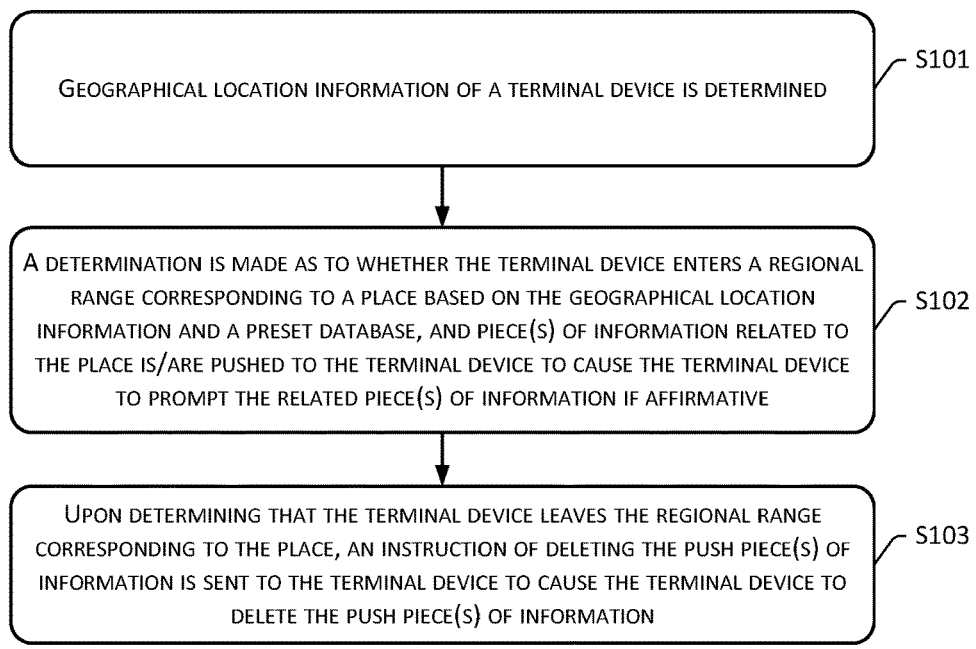
FIG. 1 is a flowchart of a first method according to the embodiments of the present disclosure.

The technical solutions in the embodiments of the present disclosure will be clearly and fully described hereinafter with reference to the accompanying drawings. Apparently, the described embodiments are only a part rather than all of the embodiments of the present disclosure. All other embodiments obtained by one of ordinary skill in the art based on the embodiments of the present disclosure shall fall within the scope of protection of the present disclosure.

In an embodiment of the present disclosure, multiple approaches of implementing a control of a piece of push information may exist. For example, in one approach, an application (App) may be provided, and the App may be divided into a server and a client. The server may be run on a server, and the client may be run on a terminal device of each user. A user may install the client of the App on a terminal device of the user, and control operations of information push to and subsequent deletion from the terminal device can be implemented through mutual cooperation between the server and the client of the App.

Alternatively, in another approach, the same purpose may be achieved directly through mutual cooperation between a server and a terminal device. In other words, functions such as information push, deletion, etc., may be consolidated into a specific terminal device, and become system-level functions of the terminal device. In this way, a user may enjoy the convenience brought by these functions without a need of installing other application clients on a terminal device.

In short, in an actual application, a piece of information to be pushed is generally produced on a server side. After the piece of information to be pushed is pushed by the server side to a terminal device, the terminal device or an App client installed therein may complete operations such as subsequent information prompting, deletion, etc.

Besides, a piece of information may be pushed in a number of different occasions. For example, in one manner, a server may monitor a location of each terminal device and push a piece of information based on the specific location of each terminal device. Each terminal device or an App installed therein subsequently performs specific operations such as information prompting, deletion, etc. Alternatively, in another implementation, a server may push pieces of push information to be pushed to a terminal device in advance, and store the pieces of information in the terminal device. Furthermore, each piece of information may include a respective regional range attribute. In this way, the terminal device or an App therein subsequently determines which specific piece of information to be prompted or deleted based on location information of the terminal device.

Therefore, various specific implementation solutions may be obtained based on different execution entities of a terminal device side and different pushing occasions of a server, and are individually introduced hereinafter.

First Embodiment

In the first embodiment of the present disclosure, information push to a terminal device and subsequent deletion control may be initiated by a server terminal, and specific information prompting or deletion operation is executed by a terminal device (which is referred to as a "first application" in the embodiment of the present disclosure for ease of introduction).

Specifically, when a piece of information is pushed through the above system, since a piece of information pushed to a terminal device is usually related to a place where a user is located, e.g., when a user enters a shopping mall or is near a shopping mall, promotion information, etc., that is related to the shopping mall may be pushed to a terminal device of the user. Therefore, in the embodiment of the present disclosure, a database may be set up in a server in advance. The database may store regional range information corresponding to each place and information related to each place, including promotion information of a shopping mall, etc. For example, in a specific implementation, a structure of the database may be represented as Table 1 below:

TABLE 1

| Place No. | Regional range | Related information |
|---|---|---|
| 1 | (x1, y1), R1 | Information 1 |
| 2 | (x2, y2), R2 | Information 2 |
| 3 | (x3, y3), R3 | Information 3 |
| ... | ... | ... |

In Table 1, regional range information may be represented by location information of each place, for example, represented by a center location and a radius in Table 1. In other words, each place may correspond to a circular region. Apparently, other representations may also be adopted in other implementations. For example, a rectangular region is marked by locations of any three vertices of a rectangle. It should be noted that a specific regional range may be equal to a geographical area by a place, or may be slightly larger than the geographical area that is actually occupied in one implementation, when regional range information corresponding to each place is recorded in the database. This can facilitate pushing of a piece of information to a user who is located near the place. Moreover, it should be noted that the regional range information recorded in the database may be extracted through a map database, or may be submitted by each place. Furthermore, information related to each place may also be submitted by each place to the server, and a validity period of each piece of information may also be submitted, for example. In this way, the server may perform a service of pushing information during the validity period.

Therefore, positioning information of a terminal device of a user may be determined based on a positioning system, for example, on the terminal device of the user. The determined positioning information may be compared with the regional range of each database recorded in the database. When the terminal device of the user enters a regional range corresponding to a certain place, information related to that place may be pushed to the terminal device.

Furthermore, a place that needs information push is generally deployed with a wireless network. For example, WiFi signals are sent by a wireless router, etc. Terminal devices entering the coverage of the WiFi signals may access the Internet via the wireless network. In one aspect, the coverage of the WiFi signals is limited. If a terminal device enters the coverage of the WiFi signals, this indicates that a user thereof has entered the place or is nearby the place. In other words, the coverage of the WiFi signals can represent a regional range corresponding to the place to some extent. In another aspect, for a server of an application, information about the Internet access mode of a user may generally be determined provided that permission of the user is obtained. In other words, if a user allows a certain application to acquire information about the Internet access mode thereof, a server of the application may acquire a corresponding wireless network identifier (such as a Service Set Identifier (SSID)) when the user accesses the Internet through a WiFi signal. For example, if a user accesses the Internet using a WiFi signal of a certain shopping mall, a server of an application may acquire a SSID of a wireless network where the user is located.

Based on the factors of the above two aspects, when regional range information of each place is stored in a database, the regional range information may be represented directly using an identifier of a respective wireless network deployed in each place. For example, a specific structure of the database may be represented in Table 2 below:

TABLE 2

| Place No. | Regional range | Related information |
|-----------|----------------|---------------------|
| 1 | SSID 1 | Information 1 |
| 2 | SSID 2 | Information 2 |
| 3 | SSID 3 | Information 3 |
| ... | ... | ... |

SSID and related information, etc., of each place may be submitted by the respective place to a server terminal, and recorded in a database. In this way, in order to determine whether a terminal device enters a regional range of a certain place, a determination may first be made as to whether such user equipment accesses the Internet via a wireless network. If affirmative, an identifier of the wireless network used by the user equipment is acquired, and compared with recorded information in the database. If the acquired identifier is identical to a wireless network identifier in a record thereof, this indicates that the terminal device accesses the Internet using a wireless network in a certain place, and a determination may further be made as to whether the terminal device is located in a regional range corresponding to the place.

In short, under the circumstances that the above database is pre-stored in a server terminal, a process of pushing a piece of information to a user terminal device may be implemented based on the database. Thus, in an embodiment of the present disclosure, information that has been pushed to the user terminal device may be processed subsequently based thereon. Specifically, in the embodiment of the present disclosure, after taking into account that information pushed based on a place is generally valid only when a user is still in a regional range of the place and may be invalid once the user leaves the regional range of the place, a location of a user terminal device may further be monitored after related information is pushed to the user based on the place. In response to detecting that the user has left the regional range corresponding to the place, the push information may be deleted to prevent the daily life of the user from disruption that is caused by an excessive amount of expired or invalid information. Details thereof are introduced hereinafter.

Referring to FIG. 1, the first embodiment of the present disclosure firstly provides a method 100 of deleting a piece of push information from the perspective of a server terminal. The method 100 may include the following operations.

S101: Geographical location information of a terminal device is determined.

In a specific implementation, a server may determine geographical location information of a terminal device using a variety of different approaches. A specific approach may correspond to regional range information of each place stored in a database of the server terminal. For example, if regional range information of each place that is stored in a database is represented by location information of the respective place, geographical location information of a terminal device of a user may be determined based on positioning information uploaded by a client of the terminal device of the user. In other words, in this case, since a terminal device of a user is generally equipped with a positioning system, positioning information of the user can be monitored in real time and can generally be represented in a form of a location. Therefore, a client may read the positioning information from the positioning system and upload the positioning information to the server, so that the server can determine the geographical location information of the terminal device of the user based on the positioning information.

If the regional information of each place stored in the database of the server is identifier information of a wireless network deployed in the respective place, an Internet access mode used by a terminal device of a user may be determined when determining geographical location information of the terminal device of the user. If the Internet is accessed via a wireless network, identifier information of the wireless network may be acquired, and is used as the geographical location information of the terminal device of the user. Apparently, this identifier information does not represent a geographical location directly, but can indirectly indicate whether the terminal device is located within a certain regional range because the coverage of wireless network signals has a regional range and a location of a device that transmits the wireless network signals is generally fixed.

S102: A determination is made as to whether the terminal device enters a regional range corresponding to a place based on the geographical location information and a preset database, and piece(s) of information related to the place is/are pushed to the terminal device to cause the terminal device to prompt the related piece(s) of information if affirmative, where the database stores regional range information of each place and related pieces of information.

After the geographical location information of the user terminal device is determined, the geographical location information may be compared with regional range information of each place stored in a database. For example, if the geographical location information is positioning information, the positioning information may be compared with location information of each place stored in the database to determine whether a location corresponding to the positioning information is located within a regional range of a certain place. If the geographical location information is wireless network identifier information, the wireless network identifier information may be matched with wireless network identifiers corresponding to each place stored in the database. If the wireless network identifier information is identical to a wireless network identifier corresponding to a certain place, the terminal device may be determined to be located in a regional range of that place, etc.

Furthermore, after determining that the user is located in a regional range of a certain place, piece(s) of information related to that place may be extracted from the database and pushed to the terminal device of the user because the database also records respective pieces of information related to each place. As such, the terminal device or a first application installed therein may prompt the user that the piece(s) of push information is/are received, and may also provide the piece(s) of information to the user in a form of a display, a voice playback, etc.

S103: Upon determining that the terminal device leaves the regional range corresponding to the place, an instruction of deleting the piece(s) of push information is sent to the terminal device to cause the terminal device to delete the piece(s) of push information.

After the piece(s) of information related to the place where the terminal device is located is/are pushed to the terminal device in the above manner, the embodiment of the present disclosure may further monitor geographical location information of the terminal device of the user continuously, and may send an instruction of deleting the piece(s) of push information upon detecting that the terminal device leaves the regional range of the place. Therefore, the terminal device may delete the piece(s) of push information, and the user may not see the piece(s) of push information any more, thus causing no interference to the user.

In other words, in the present embodiment of the present disclosure, piece(s) of information related to a place may be pushed to a mobile terminal device in response to detecting that a user enters a regional range of the place. In response to detecting that the user leaves the place, the previously piece(s) of push information may be regarded as invalid or expired information, and deleted from the terminal device of the user, thereby avoiding interference caused by such piece(s) of information to the daily life of the user.

Apparently, in a real application, after a user receives a piece of push information, specific content of the piece of push information is generally displayed or played to the user only when the user triggers a viewing operation by clicking, for example. Otherwise, the user may be prompted in a manner such as adding a tag on an application icon, for example. A piece of push information with specific content having been viewed by a user may be useful to the user at a later time, because the user has viewed the specific content thereof and may delete it manually if determined to be useless to him/her. Therefore, in an embodiment of the present disclosure, in order to avoid deleting a piece of information that is useful to a user, a user viewing situation of a piece of push information may be determined before a deletion instruction is sent to a client, after detecting that the user leaves a regional range of a place. If the piece of push information is not viewed, the deletion instruction is sent to the client. Otherwise, the deletion instruction is not sent. Apparently, in a specific implementation, in order to enable a server to acquire the viewing situation of the piece of push information, the client may monitor the viewing situation of the piece of push information, and send a notification message to the server in response to finding that the piece of push information is viewed. In this way, the server may determine whether the piece of push information is viewed based on whether the notification message from the client is received.

Second Embodiment

Figure 2:
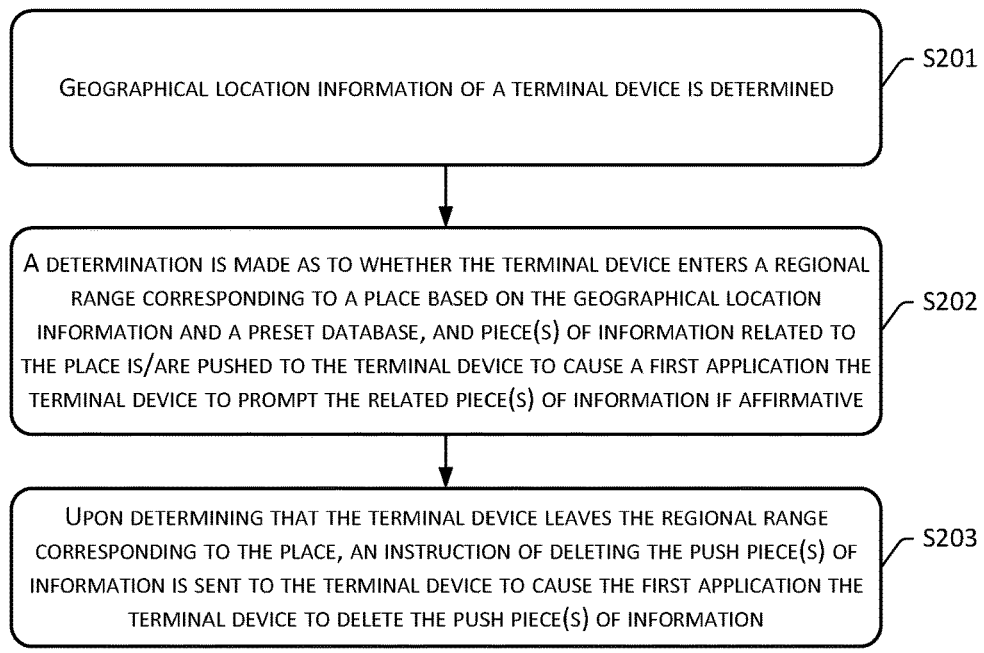
FIG. 2 is a flowchart of a second method according to the embodiments of the present disclosure.

In the first embodiment, after a server pushes a piece of information to a terminal device, the terminal device prompts the piece of information by itself, and subsequently performs a deletion operation on its own after receiving the deletion instruction from the server. The second embodiment of the present disclosure is different from the first embodiment in that a first application in the terminal device performs the actual prompt and deletion operations. In other words, the second embodiment also provides a method 200 of deleting a piece of push information from the perspective of a server. Referring to FIG. 2, the method 200 may include the following operations.

S201: Geographical location information of a terminal device is determined.

S202: A determination is made as to whether the terminal device enters a regional range corresponding to a place based on the geographical location information and a preset database, and piece(s) of information related to the place is/are pushed to the terminal device to cause a first application in the terminal device to prompt the related piece(s) of information if affirmative, where the database stores regional range information of each place and related pieces of information.

S203: Upon determining that the terminal device leaves the regional range corresponding to the place, an instruction of deleting the piece(s) of push information is sent to the terminal device to cause the first application in the terminal device to delete the piece(s) of push information.

Third Embodiment

Figure 3:
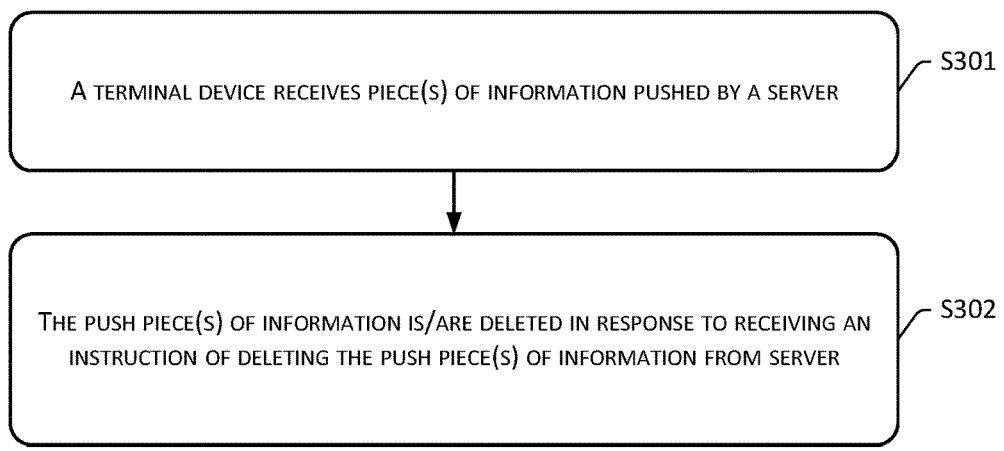
FIG. 3 is a flowchart of a third method according to the embodiments of the present disclosure.

The first embodiment and the second embodiment introduce a method of controlling a piece of push information according to the embodiments of the present disclosure mainly from the perspective of a server in detail, while the third embodiment provides a description mainly from the perspective of a terminal device. Specifically, since an execution entity at the end of a terminal device may be the terminal device itself or a first application in the terminal device, the two situations are described separately. Referring to FIG. 3, the third embodiment provides a method 300 of deleting a piece of push information using a terminal device as an execution entity, and the method 300 may include the following operations.

S301: A terminal device receives piece(s) of information pushed by a server, the piece(s) of push information being related to a place where the terminal device is currently located.

S302: The piece(s) of push information is/are deleted in response to receiving an instruction of deleting the piece(s) of push information from server, the instruction being sent by the server after determining that the terminal device has left the place.

In other words, for the terminal device, primary functions thereof are to prompt a user after receiving a piece of information pushed by a server and to perform a corresponding deletion operation in response to receiving an instruction of deleting the piece of push information from the server. Apparently, in a specific implementation, in order to enable the server to acquire geographical location information of the terminal device, the terminal device may send positioning information acquired from the terminal device to the server, so that the server may determine the geographical location information of the terminal device using the positioning information, and determine whether the terminal device enters or leaves a regional range corresponding to a place based on the geographical location information and respective regional range information that corresponds to each place and is stored in a database. Furthermore, when the piece of push information is viewed, the terminal device may also send a notification message to the server, so that the server can determine a viewing situation of the piece of push information based on the notification message, and sends an instruction of deleting the piece of push information if the piece of push information is not viewed after determining that the terminal device has left the regional range corresponding to the place, thereby avoiding deleting piece(s) of push information that may be useful to the user.

Fourth Embodiment

Figure 4:
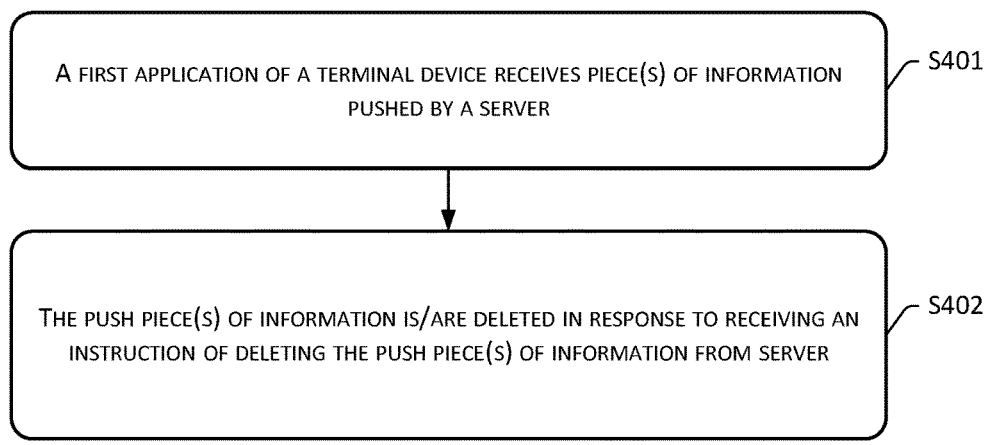
FIG. 4 is a flowchart of a fourth method according to the embodiments of the present disclosure.

Similar to the third embodiment, the fourth embodiment also provides a description from the perspective of a user side, but uses a first application in a terminal device as an execution entity. Referring to FIG. 4, the fourth embodiment provides a method 400 of deleting a piece of push information, and the method 400 may include the following operations.

S401: A first application of a terminal device receives piece(s) of information pushed by a server terminal, the piece(s) of push information being related to a place where the terminal device is currently located.

S402: The piece(s) of push information is/are deleted when an instruction of deleting the piece(s) of push information sent by the server terminal is received, the instruction being sent by the server after determining that the terminal device has left the place.

It should be noted that the third embodiment and the fourth embodiment correspond to the first embodiment and the second embodiment, and are merely different from the perspective of description as compared with the first embodiment. Related implementation details have been introduced in the first embodiment and the second embodiment. Therefore, reference may be made to the description in the first embodiment and the second embodiment, and details thereof are not repeatedly described herein.

Fifth Embodiment

In the foregoing embodiments, a server determines geographical location information of a terminal device of a user, and detects whether the terminal device enters or leaves a regional range of a place, so that a related piece of information is pushed or deleted. In the fifth embodiment, a server may also send piece(s) of information that is/are to be pushed to a terminal device in advance, with each piece of information including a corresponding regional range attribute. Apparently, after receiving the piece(s) of information pushed by the server, the terminal device may not push the piece(s) of information to the user first, but store the piece(s) of information at the back stage. Furthermore, the terminal device or a first application therein detects geographical location information of the terminal device of the user, prompts the user in response to detecting that the terminal device enters a regional range associated with a certain piece of information, for example, prompting the user to view the piece of information, and deletes the piece of information upon detecting that the terminal device leaves the regional range associated with the piece of information. In other words, the server no longer determines the geographical location information of the terminal device of the user, and pushes a piece of information or sends a deletion instruction accordingly under this approach. After a piece of information is pushed to a client, subsequent pushing and deletion operations can be completed by the terminal device or the first application therein.

Figure 5:
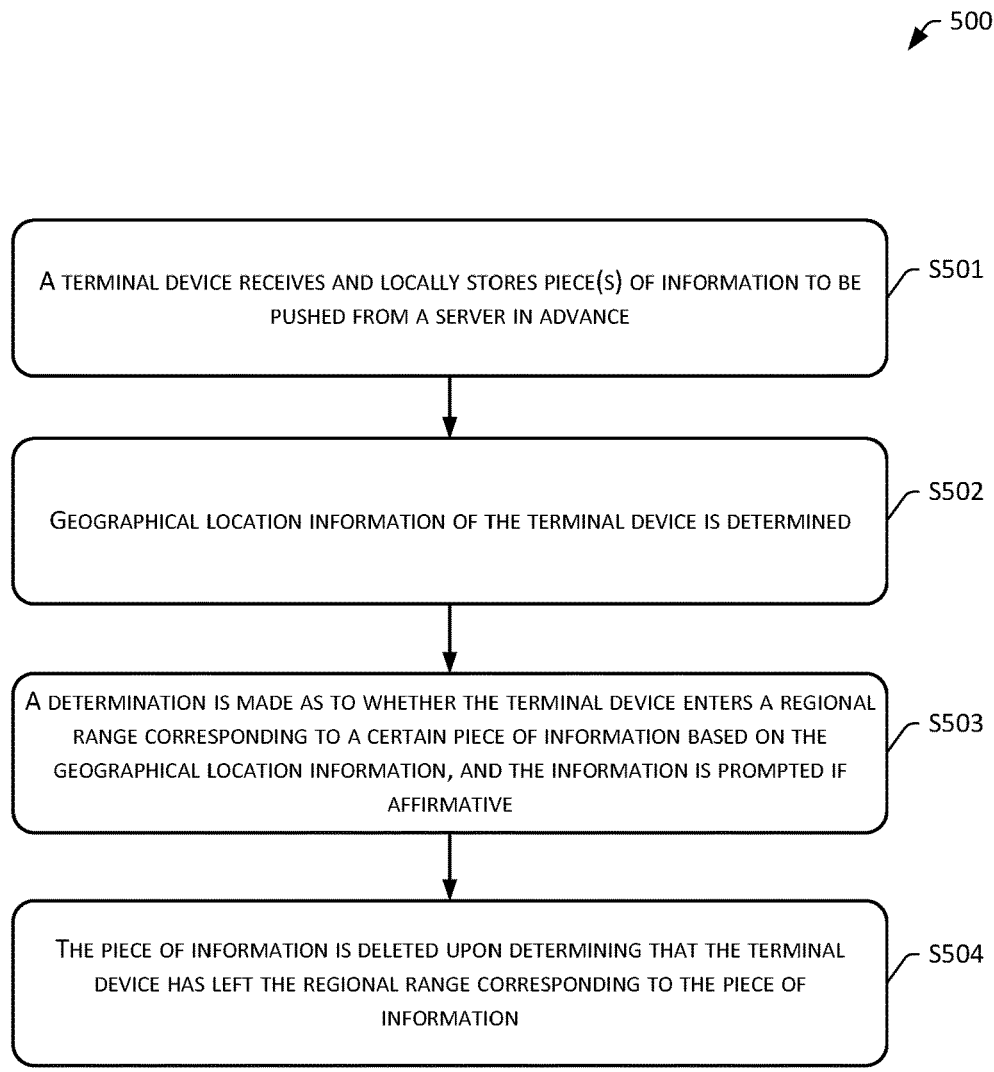
FIG. 5 is a flowchart of a fifth method according to the embodiments of the present disclosure.

Specifically, the fifth embodiment provides a description from the perspective of the user side, and considers a terminal device as an execution entity. Referring to FIG. 5, the fifth embodiment provides another method 500 of deleting a piece of push information, and the method 500 may include the following operations.

S501: A terminal device receives and locally stores piece(s) of information to be pushed from a server in advance, the piece(s) of information including respective regional range attribute(s).

A regional range attribute included in a piece of information may be defined at the server. The server may push multiple pieces of information to the terminal device at one time, and different pieces of information may correspond to different regional range attributes. In a specific implementation, in order to avoid the occupancy of user traffic and improve the success rate of push, the server may push the pieces of information when the terminal device of the user accesses the Internet via WiFi or the like. After receiving a piece of information sent by the server terminal, the terminal device may firstly store the piece of information locally at the back end, i.e., the user may not be necessarily aware of this process.

S502: Geographical location information of the terminal device is determined.

After receiving the piece(s) of information pushed by the server, the terminal device may monitor geographical location information thereof. Specifically, the geographical location information may be acquired using a positioning system equipped in the terminal device.

S503: A determination is made as to whether the terminal device enters a regional range corresponding to a certain piece of information based on the geographical location information, and the information is prompted if affirmative.

After detecting the geographical location information of the terminal device, the terminal device may compare the geographical location information with respective regional range information corresponding to each piece of information, and prompt (i.e., pushes from the back end to the front end) a piece of information, in response to detecting that the terminal device enters a regional range corresponding to that piece of information, so that the user may be aware of that piece of information.

S504: The piece of information is deleted upon determining that the terminal device has left the regional range corresponding to the piece of information.

Subsequently, after detecting that the terminal device leaves the regional range corresponding to the piece of information, the terminal device may directly delete the piece of information, to avoid interference caused by invalid information to the user. Apparently, in this fifth embodiment, a piece of information, if having not been read, may be deleted as invalid information. Otherwise, a piece of information is not deleted if having been read.

Sixth Embodiment

Figure 6:
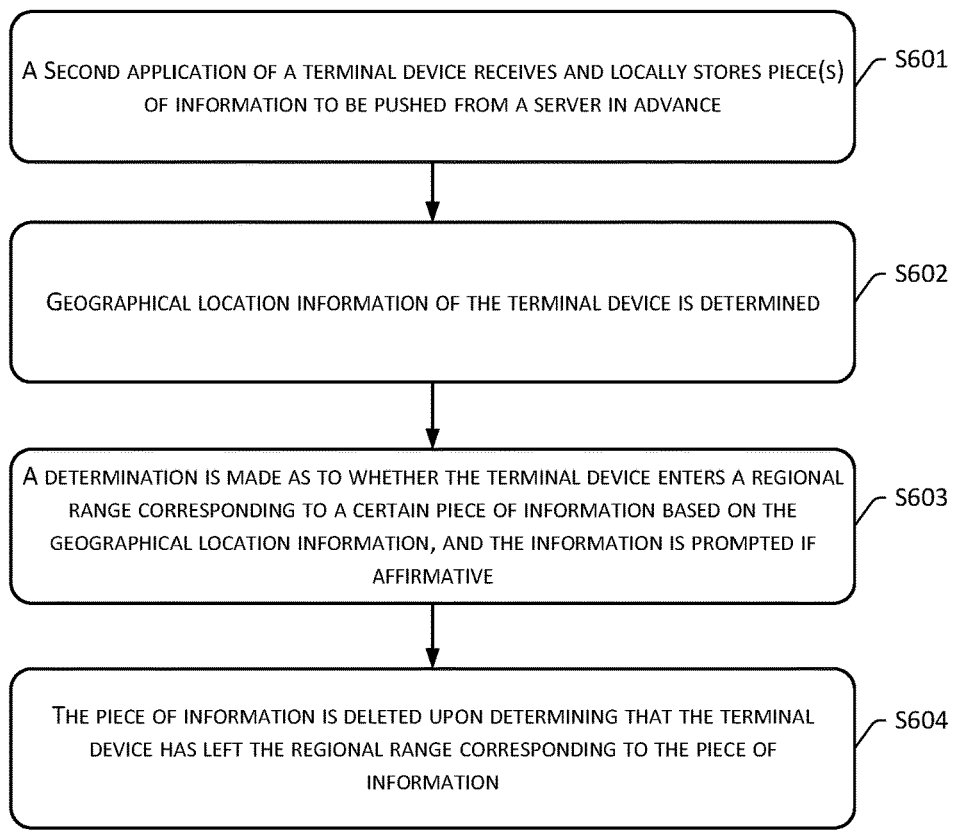
FIG. 6 is a flowchart of a sixth method according to the embodiments of the present disclosure.

The sixth embodiment corresponds to the fifth embodiment, and is merely different with respect to an execution entity. Accordingly, this embodiment is described briefly. Specifically, in the sixth embodiment, the execution entity may be a second application installed in a terminal device. Referring to FIG. 6, a method 600 of deleting a piece of push information provided by the sixth embodiment may include the following operations.

S601: A second application of a terminal device receives piece(s) of information to be pushed from a server and stores the piece(s) of information locally at the terminal device, where the piece(s) of information include(s) respective regional range attribute(s).

S602: Geographical location information of the terminal device is determined.

S603: A determination is made as to whether the terminal device enters a regional range corresponding to a certain piece of information based on the geographical location information, and prompts the piece of information if affirmative.

S604: The piece of information is deleted after determining that the terminal device leaves the regional range corresponding to the piece of information.

It should be noted that the server is configured to generate a piece of information that includes a geographical regional range attribute, and send the piece of information to the terminal device in the solutions of the fifth and sixth embodiments.

Seventh Embodiment

Corresponding to the solutions provided by the fifth and sixth embodiments, the seventh embodiment further provides a type of piece of information. This type of piece of information includes a regional range attribute, so that the piece of information is pushed to a terminal device which enters a regional range, and is deleted when the terminal device leaves the regional range.

Figure 7:
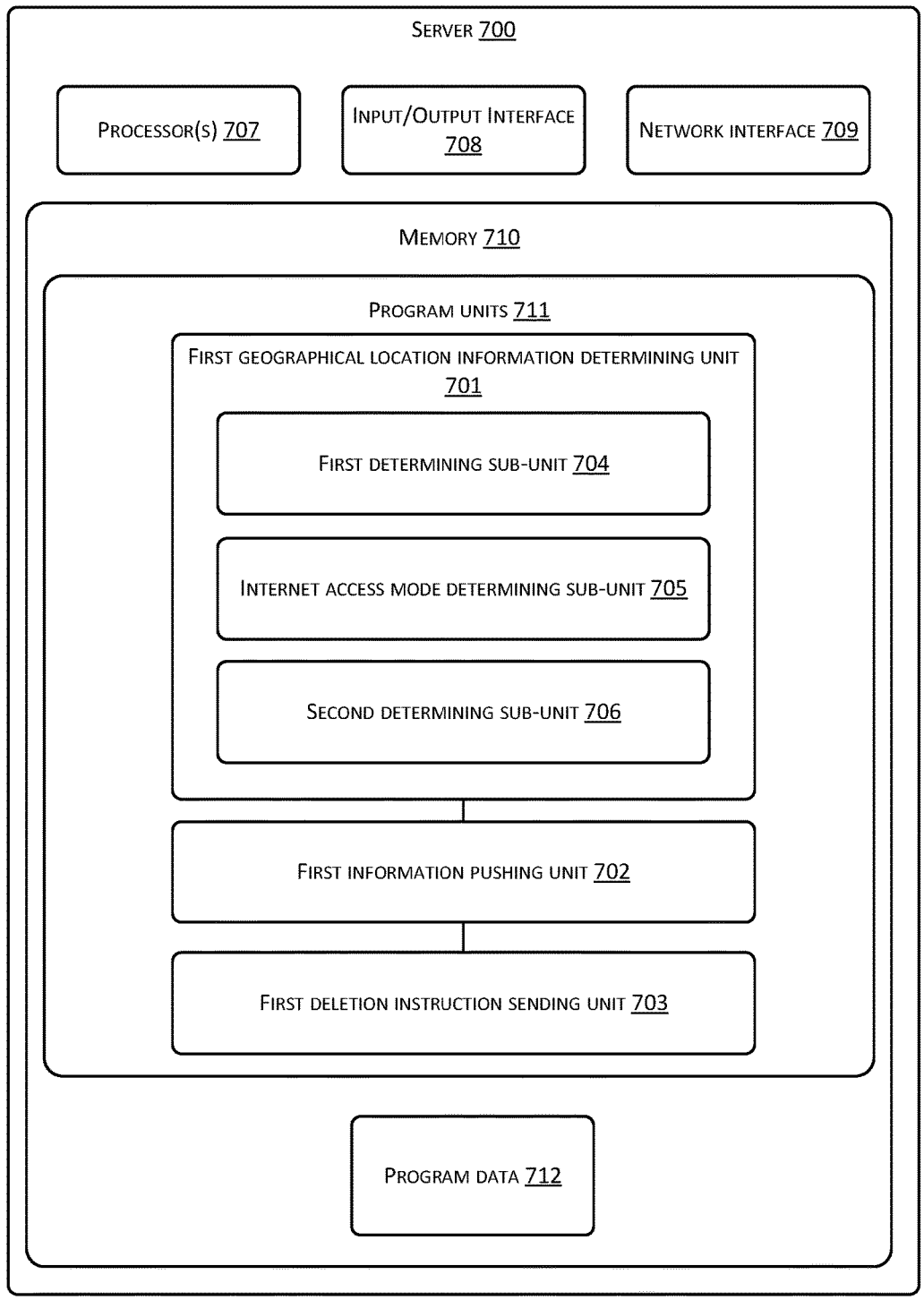
FIG. 7 is a schematic diagram of a first apparatus according to the embodiments of the present disclosure.

Corresponding to the method of deleting a piece of push information according to the first embodiment of the present disclosure, the embodiments of the present disclosure also provide a server 700 of deleting a piece of push information. Referring to FIG. 7, the server 700 may include a first geographical location information determining unit 701, a first information pushing unit 702, and a first deletion instruction sending unit 703.

The first geographical location information determining unit 701 may determine geographical location information of a terminal device. The first information pushing unit 702 may determine whether the terminal device enters a regional range corresponding to a place based on the geographical location information and a preset database, and piece(s) of push information related to the place to the terminal device to cause the terminal device or a first application therein to prompt the related piece(s) of information if affirmative, wherein the database stores regional range information of each place and respective related pieces of information. The first deletion instruction sending unit 703 may send an instruction of deleting the piece(s) of push information to the terminal device to cause the terminal device or the first application therein to delete the piece(s) of push information in response to determining that the terminal device leaves the regional range corresponding to the place.

In implementations, the regional range information of each place stored in the database includes location information corresponding to the respective place. The first geographical location information determining unit 701 may include a first determining sub-unit 704 configured to determine geographical location information of the terminal device based on positioning information uploaded by the terminal device, so that a determination as to whether the terminal device enters or leaves the regional range corresponding to the place is determined based on the positioning information and the location information that corresponds to each place and is pre-stored in the database.

Alternatively, the regional range information of each place stored in the database includes identifier information of a wireless network deployed in the respective place. The first geographical location information determining unit 701 may include an Internet access mode determining sub-unit 705 configured to determine an Internet access mode of the terminal device; and a second determining sub-unit 706 configured to determine identifier information of a wireless network if the Internet access mode is an Internet access via the wireless network, set the identifier information of the wireless network as the geographical location information to facilitate determining whether the terminal device enters the regional range corresponding to the place based on correspondence relationships between places and wireless network identifiers that are stored in the database, and determine that the terminal device leaves the regional range corresponding to the place when the terminal device switches to another Internet access mode or another wireless network.

In implementations, the server 700 may include one or more computing devices. By way of example and not limitation, the server 700 may further include one or more processors 707, an input/output (I/O) interface 708, a network interface 709, and memory 710.

The memory 710 may include a form of computer-readable media, e.g., a non-permanent storage device, random-access memory (RAM) and/or a nonvolatile internal storage, such as read-only memory (ROM) or flash RAM. The memory 710 is an example of computer-readable media.

The computer-readable media may include a permanent or non-permanent type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer-readable media does not include transitory media, such as modulated data signals and carrier waves. For the ease of description, the system is divided into various types of units based on functions, and the units are described separately in the foregoing description. Apparently, the functions of various units may be implemented in one or more software and/or hardware components during an implementation of the present disclosure.

In implementations, the memory 710 may include program units 711 and program data 712. The program units 711 may include one or more of the foregoing units as shown in FIG. 7, for example.

Figure 8:
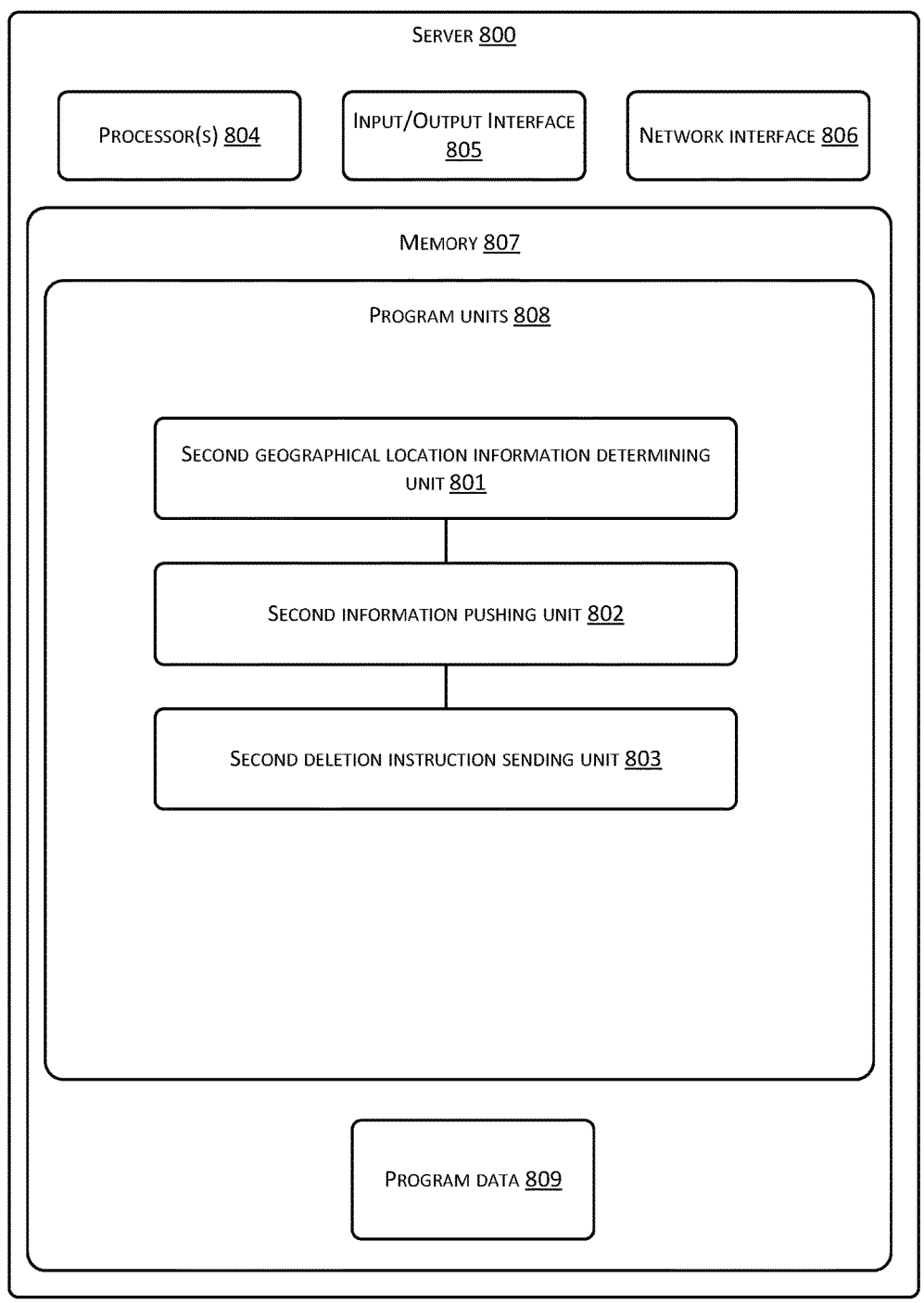
FIG. 8 is a schematic diagram of a second apparatus according to the embodiments of the present disclosure.

Corresponding to the method of deleting a piece of push information according to the second embodiment of the present disclosure, the embodiments of the present disclosure also provide another server 800 of deleting a piece of push information. Referring to FIG. 8, the server 800 may include a second geographical location information determining unit 801, a second information pushing unit 802, and a second deletion instruction sending unit 803.

The second geographical location information determining unit 801 may determine geographical location information of a terminal device. The second information pushing unit 802 may determine whether the terminal device enters a regional range corresponding to a place based on the geographical location information and a preset database, and piece(s) of push information related to the place to the terminal device to cause a first application in the terminal device to prompt the related piece(s) of information if affirmative, wherein the database stores regional range information of each place and related pieces of information. The second deletion instruction sending unit 803 may send an instruction of deleting the piece(s) of push information to the terminal device after determining that the terminal device leaves the regional range corresponding to the place, so that the first application in the terminal device deletes the piece(s) of push information.

In implementations, the server 800 may include one or more computing devices. By way of example and not limitation, the server 800 may further include one or more processors 804, an input/output (I/O) interface 805, a network interface 806, and memory 807. The memory 807 is an example of computer-readable media. In implementations, the memory 807 may include program units 808 and program data 809. The program units 808 may include one or more of the foregoing units as shown in FIG. 8, for example.

Figure 9:
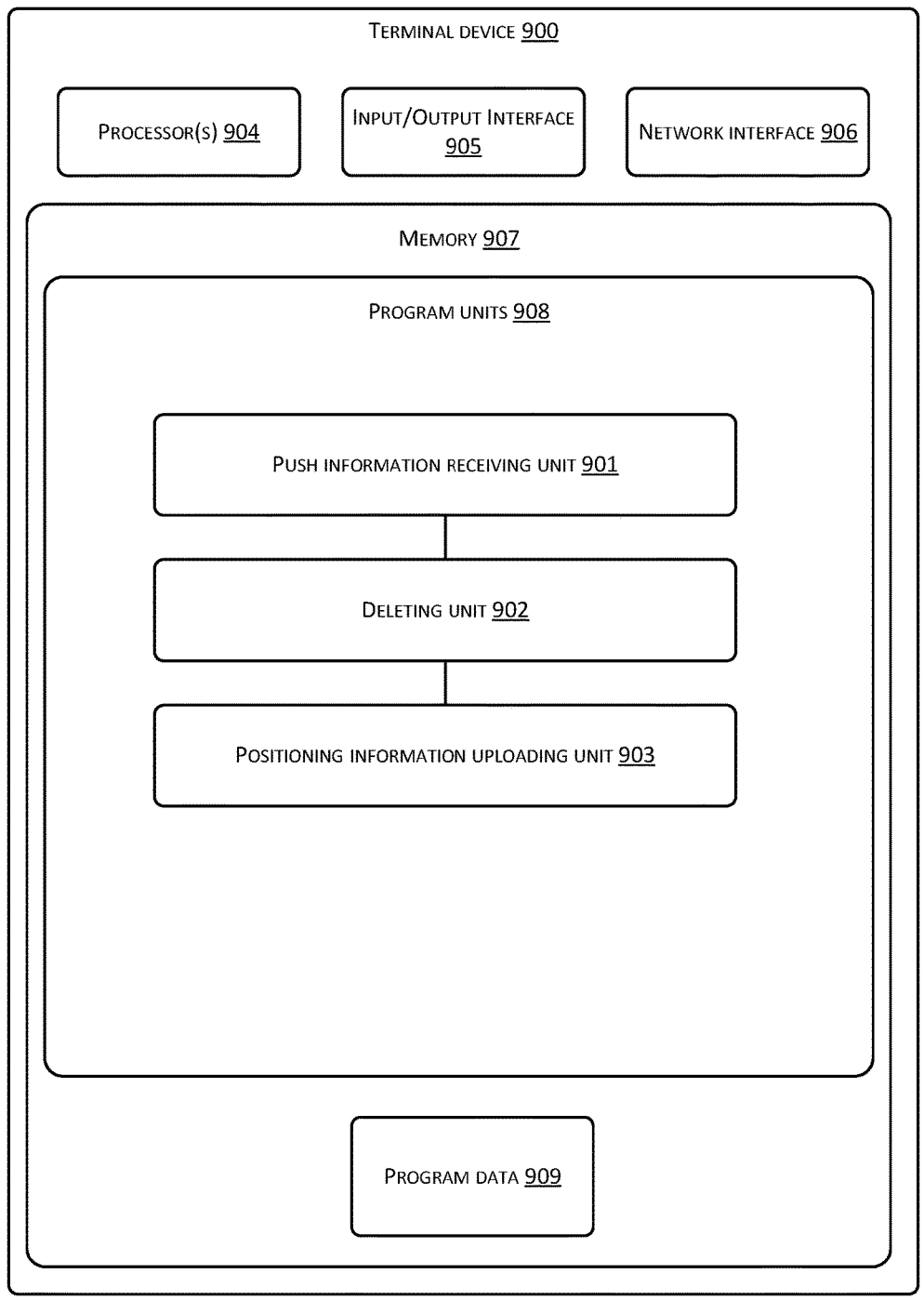
FIG. 9 is a schematic diagram of a third apparatus according to the embodiments of the present disclosure.

Corresponding to the method of deleting a piece of push information according to the third embodiment of the present disclosure, the embodiments of the present disclosure also provide a terminal device 900 of deleting a piece of push information. Referring to FIG. 9, the terminal device 900 may include a push information receiving unit 901 configured to receive piece(s) of information pushed by a server terminal, the piece(s) of push information being related to a place where the terminal device is currently located; and a deleting unit 902 configured to delete the piece(s) of push information in response to receiving an instruction of deleting the piece(s) of push information sent by the server terminal, the instruction being sent by the server after determining that the terminal device leaves the place.

In an implementation, the terminal device 900 may also include a positioning information uploading unit 903 configured to send positioning information acquired from the terminal device to the server, so that the server determines geographical location information of the terminal device using the positioning information, and determines whether the terminal device enters or leaves the regional range corresponding to the place based on the geographical location information and respective regional range information that corresponds to each place and is pre-stored in a database.

In implementations, the terminal device 900 may include one or more computing devices. By way of example and not limitation, the terminal device 900 may further include one or more processors 904, an input/output (I/O) interface 905, a network interface 906, and memory 907. The memory 907 is an example of computer-readable media. In implementations, the memory 907 may include program units 908 and program data 909. The program units 908 may include one or more of the foregoing units as shown in FIG. 9, for example.

Figure 10:
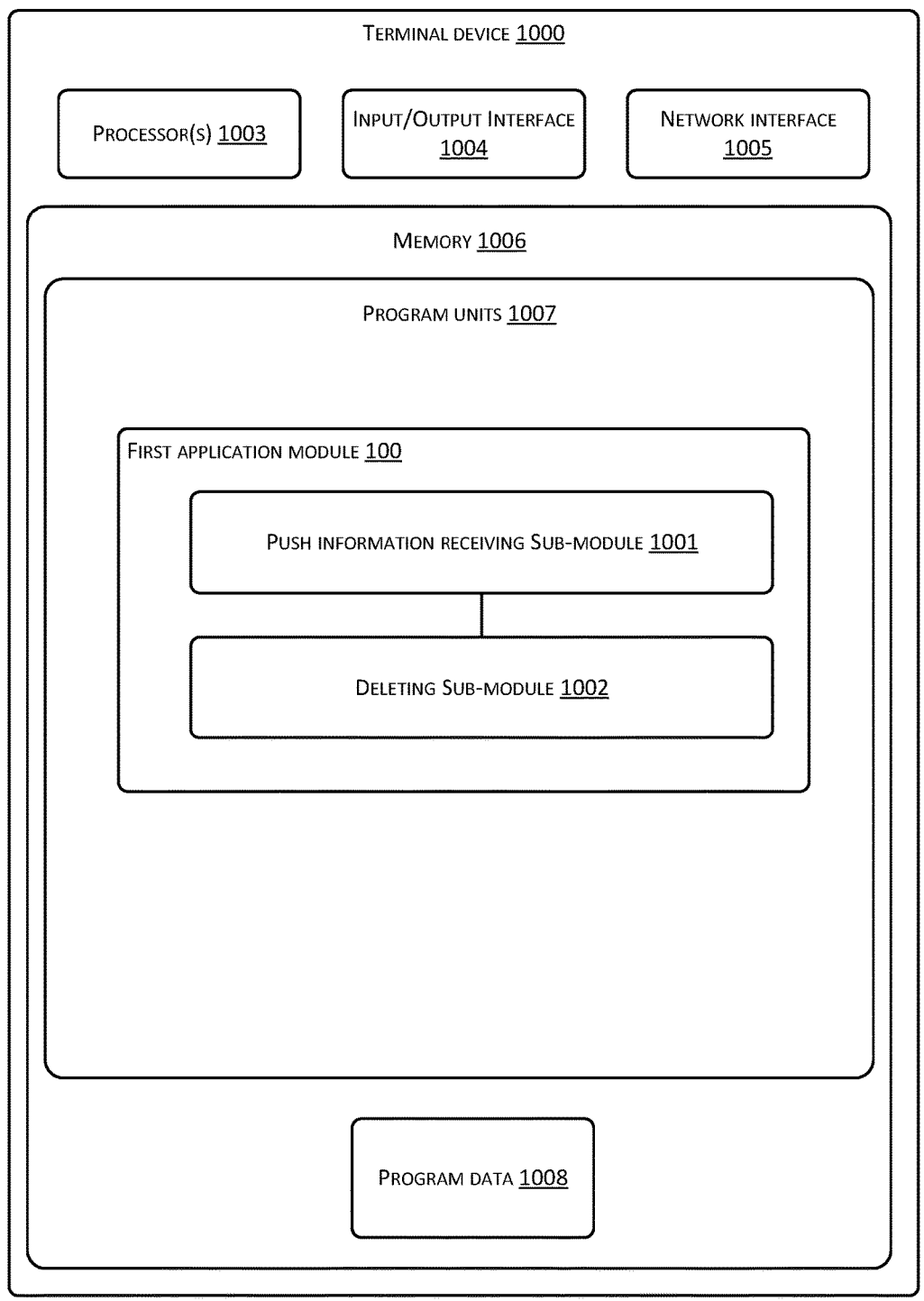
FIG. 10 is a schematic diagram of a fourth apparatus the embodiments of the present disclosure.

Corresponding to the method of deleting a piece of push information according to the fourth embodiment of the present disclosure, the embodiments of the present disclosure also provide a terminal device 1000 of deleting a piece of push information. The terminal device 1000 includes a first application module. Referring to FIG. 10, the first application module 100 may include a push information receiving sub-module 1001 configured to receive piece(s) of information pushed by a server terminal, the piece(s) of push information being related to a place where the terminal device is currently located; and a deleting sub-module 1002 configured to delete the piece(s) of push information in response to receiving an instruction of deleting the piece(s) of push information sent by the server terminal, the instruction being sent by the server after determining that the terminal device leaves the place.

In implementations, the terminal device 1000 may include one or more computing devices. By way of example and not limitation, the terminal device 1000 may further include one or more processors 1003, an input/output (I/O) interface 1004, a network interface 1005, and memory 1006. The memory 1006 is an example of computer-readable media. In implementations, the memory 1006 may include program units 1007 and program data 1008. The program units 1007 may include one or more of the foregoing units as shown in FIG. 10, for example.

Figure 11:
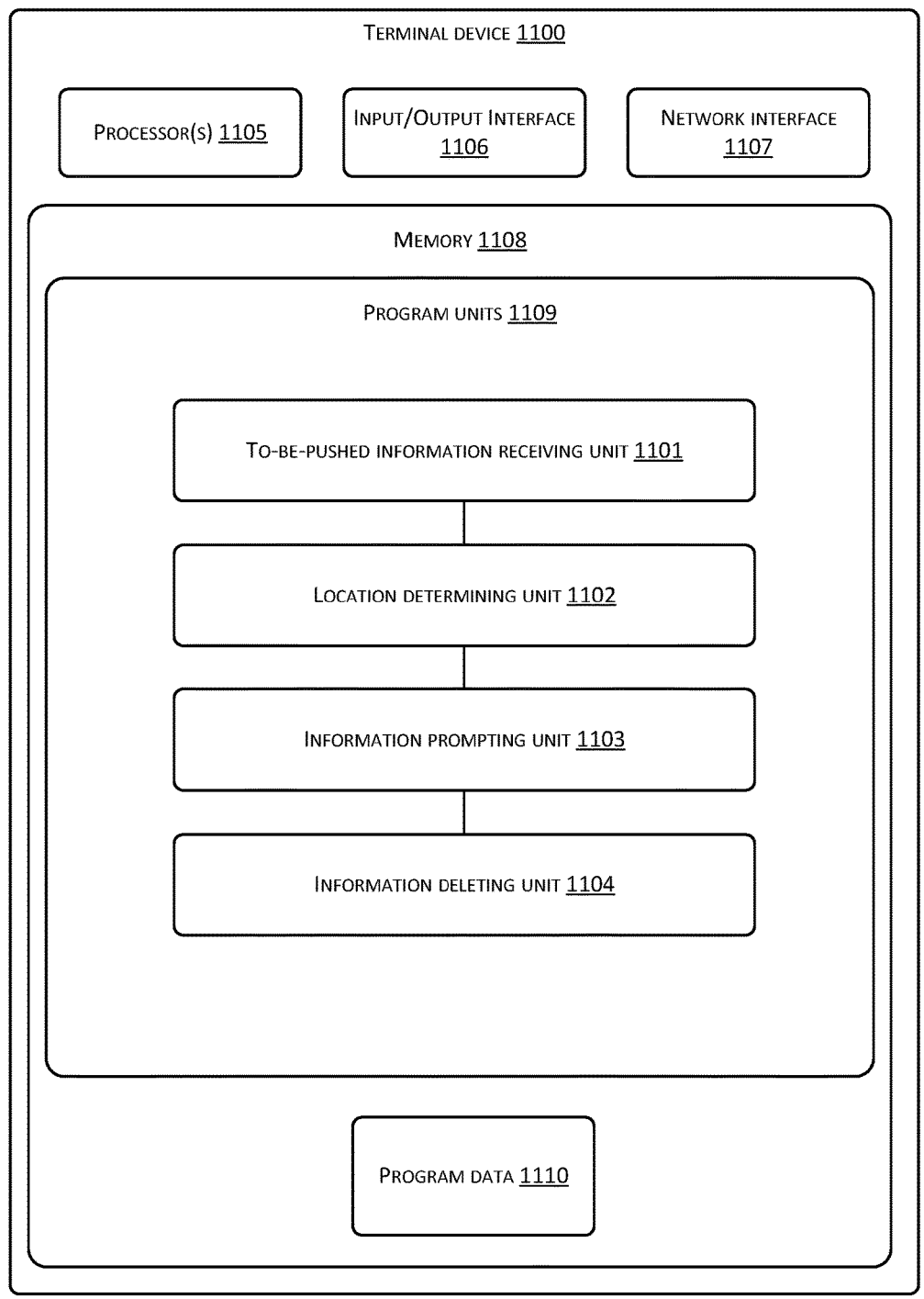
FIG. 11 is a schematic diagram of a fifth apparatus according to the embodiments of the present disclosure.

Corresponding to the method of deleting a piece of push information according to the fifth embodiment of the present disclosure, the embodiments of the present disclosure also provide a terminal device 1100 of deleting a piece of push information. Referring to FIG. 11, the terminal device 1100 may include a to-be-pushed information receiving unit 1101 configured to receive and locally store piece(s) of information to be pushed from a server in advance, the piece(s) of information including respective regional range attribute(s); a location determining unit 1102 configured to determine geographical location information of the terminal device; an information prompting unit 1103 configured to determine whether the terminal device enters a regional range corresponding to a particular piece of information according to the geographical location information, and prompt the piece of information if affirmative; and a piece of information deleting unit 1104 configured to delete the piece of information in response to determining that the terminal device leaves the regional range corresponding to the piece of information.

In implementations, the terminal device 1100 may include one or more computing devices. By way of example and not limitation, the terminal device 1100 may further include one or more processors 1105, an input/output (I/O) interface 1106, a network interface 1107, and memory 1108. The memory 1108 is an example of computer-readable media. In implementations, the memory 1108 may include program units 1109 and program data 1110. The program units 1109 may include one or more of the foregoing units as shown in FIG. 11, for example.

Figure 12:
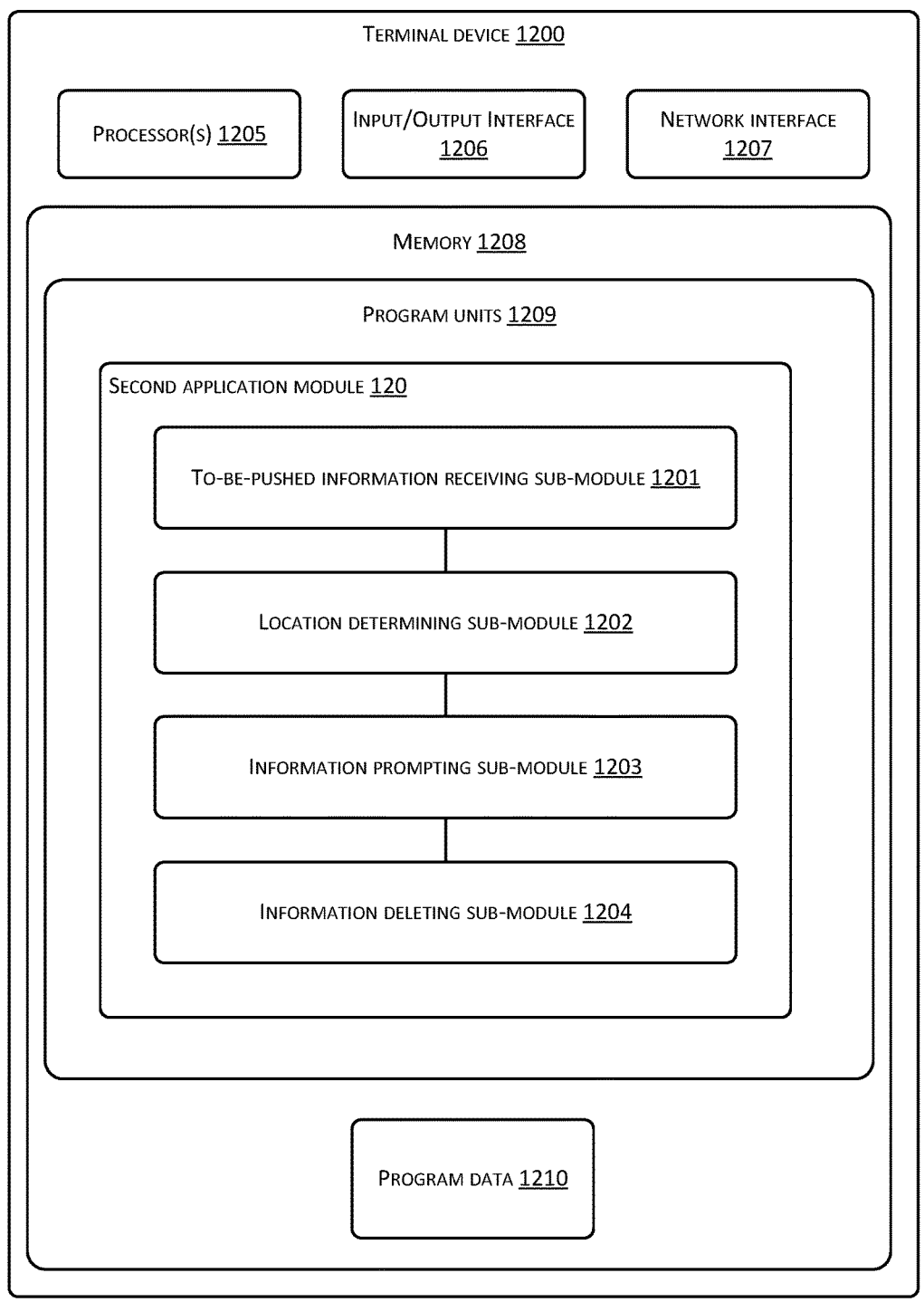
FIG. 12 is a schematic diagram of a sixth apparatus according to the embodiments of the present disclosure.

Corresponding to the method of deleting a piece of push information according to the sixth embodiment of the present disclosure, the embodiments of the present disclosure also provide a terminal device 1200 of deleting a piece of push information. Referring to FIG. 12, the terminal device 1200 includes a second application module 120, and the second application module 120 may include a to-be-pushed information receiving sub-module 1201 configured to receive and locally store piece(s) of information to be pushed from a server at the terminal device, the piece(s) of information including respective regional range attribute(s); a location determining sub-module 1202 configured to determine geographical location information of the terminal device; an information prompting sub-module 1203 configured to determine whether the terminal device enters a regional range corresponding to a particular piece of information according to the geographical location information, and prompt the piece of information if affirmative; an information deleting sub-module 1204 configured to delete the piece of information after determining that the terminal device leaves the regional range corresponding to the piece of information.

In implementations, the terminal device 1200 may include one or more computing devices. By way of example and not limitation, the terminal device 1200 may further include one or more processors 1205, an input/output (I/O) interface 1206, a network interface 1207, and memory 1208. The memory 1208 is an example of computer-readable media. In implementations, the memory 1208 may include program units 1209 and program data 1210. The program units 1209 may include one or more of the foregoing units as shown in FIG. 12, for example.

According to the embodiments of the present disclosure, information related to a place may be pushed to a mobile terminal device after detecting that a user enters a regional range of that place, and the previously push information may be regarded as invalid or expired information, and deleted from the terminal device of the user after detecting that the user leaves the place, thereby avoiding interference caused by such information to the daily life of the user.

Through the foregoing description of the implementations, one skilled in the art can clearly understand that the present disclosure can be implemented by a combination of software and a necessary universal hardware platform. Based on such understanding, the essence of the technical solutions of the present disclosure, or the portion contributing to the existing technologies may be embodied in a form of a software product. The computer software product may be stored in a storage media, such as a ROM/RAM, a magnetic disk, or an optical disc, etc., and may include instructions that cause a computing device (which may be a personal computer, a server, or a network device, etc.) to execute the method in the embodiments or certain portions of the embodiments of the present disclosure.

All the embodiments in the specification are described in a progressive manner, and reference may be made to each other for the same or similar parts of the embodiments. Emphasis of each embodiment is different from those of other embodiments. In particular, since the system or system embodiments are substantially similar to the method embodiments, the system or system embodiments are described relative briefly, and reference may be made to the corresponding description in the method embodiments for the related parts. The system or system embodiments described above are merely exemplary. Units described as separate components may or may not be physically separated, and components shown as units may or may not be physical units, i.e., may be integrated or distributed among a plurality of network units. Some or all of the modules may be selected to achieve the objective of a solution of an embodiment according to actual requirements. One of ordinary skill in the art can understand and implement the present disclosure without making any creative effort.

The method, server, and terminal device of deleting a piece of push information according to the present disclosure are described in detail above. The principles and implementations of the present disclosure are described herein using specific examples. The description of the embodiments of the present disclosure is merely provided to facilitate understanding of the methods and core ideas of the present disclosure. One of ordinary skill in the art can make modifications to the specific implementations and application scopes based on the ideas of the present disclosure. In short, the content of the specification shall not be construed as a limitation to the present disclosure.

What is claimed is:

1. A method comprising: determining, based on a terminal device having an Internet access mode of an Internet access via a wireless network, identifier information of the wireless network; setting geographical location information of the terminal device to the identifier information of the wireless network; determining that the terminal device enters a regional range corresponding to a place based on the geographical location information and a preset database;
   pushing a piece of information related to the place to the terminal device or an application of the terminal device to cause the terminal device to prompt the related piece of information; and
   sending an instruction of deleting the piece of push information to the terminal device to cause the terminal device or the application to automatically delete the piece of push information from the terminal device after determining that the terminal device leaves the regional range corresponding to the place.

2. The method according to claim 1, wherein the preset database stores regional range information of a plurality of places and respective related pieces of information.

3. The method according to claim 2, wherein the regional range information of the plurality of places comprises at least one of respective location information of the plurality of places, or respective identifier information of corresponding wireless networks deployed in the plurality of places.

4. The method according to claim 1, wherein determining the geographical location information of the terminal device comprises determining the geographical location information of the terminal device based on positioning information uploaded by the terminal device.

5. The method according to claim 4, further comprising determining whether the terminal device enters or leaves the regional range corresponding to the place based at least in part on the positioning information and location information corresponding to each place that is pre-stored in the preset database.

6. The method according to claim 1, wherein determining the geographical location information of the terminal device comprises:
   determining an Internet access mode of the terminal device;
   determining identifier information of a wireless network if the Internet access mode is an Internet access via the wireless network; and
   setting the identifier information of the wireless network as the geographical location information.

7. The method according to claim 6, further comprising determining whether the terminal device enters the regional range corresponding to the place based on correspondence relationships between a plurality of places and respective wireless network identifiers stored in the preset database.

8. The method according to claim 6, further comprising determining that the terminal device leaves the regional range corresponding to the place in response to determining that the terminal device switches to another Internet access mode or another wireless network.

9. A method comprising: receiving, by a terminal device or an application of the terminal device, a piece of information pushed by a server, the piece of push information being related to a place where the terminal device is currently located; determining geographical location information of the terminal device based on at least one of positioning information of the terminal device or identifier information of a wireless network via which the terminal device is connected to the Internet, wherein the geographical location information is determined based on the identifier information by setting the geographical location information to the identifier information; determining whether the terminal device leaves a regional range corresponding to the place based at least in part the geographical location information, wherein the piece of push information is deleted after determining that the terminal device leaves the regional range corresponding to the place; and deleting, by a terminal device or the application, the piece of push information from the terminal device automatically in response to receiving an instruction of deleting the piece of push information sent by the server, the instruction being sent by the server after the terminal device leaves the place.

10. The method according to claim 9, the acts further comprising:
sending positioning information acquired from the terminal device to the server, to enable the server to determine geographical location information of the terminal device based on the positioning information, and to determine whether the terminal device enters or leaves the regional range corresponding to the place based on the geographical location information and regional range information corresponding to each place that is pre-stored in a database.

11. The method according to claim 9, the acts further comprising receiving and locally storing one or more pieces of information to be pushed from the server in advance, the one or more pieces of information including respective one or more regional range attributes.

12. The method according to claim 11, the acts further comprising:
determining geographical location information of the terminal device; and
determining whether the terminal device leaves a regional range corresponding to the place based at least in part the geographical location information, wherein the piece of push information is deleted after determining that the terminal device leaves the regional range corresponding to the place.

13. The method according to claim 12, wherein determining the geographical location information of the terminal device comprises determining the geographical location information of the terminal device based on at least one of positioning information of the terminal device or identifier information of a wireless network via which the terminal device is connected to the Internet.

14. One or more computer-readable media storing executable instructions that, when executed by a terminal device or an application of the terminal device, cause the terminal device or the application to perform acts comprising: receiving and locally storing pieces of information to be pushed from a server in advance, the pieces of information including respective regional range attributes; determining, based on a terminal device having an Internet access mode of an Internet access via a wireless network, identifier information of the wireless network; setting geographical location information of the terminal device to the identifier information of the wireless network; determining whether the terminal device enters a regional range corresponding to a particular piece of information according to the geographical location information, and prompting the piece of information if affirmative; deleting the piece of information from the terminal device automatically after determining that the terminal device leaves the regional range corresponding to the piece of information.

15. The one or more computer-readable media according to claim 14, wherein the particular piece of information is associated with a particular place.

16. The one or more computer-readable media according to claim 14, wherein the respective regional range attributes comprises at least one of respective location information of the pieces of information, or respective identifier information of corresponding wireless networks associated with the pieces of information.

17. The one or more computer-readable media according to claim 14, wherein determining the geographical location information of the terminal device comprises determining the geographical location information of the terminal device based on positioning information uploaded by the terminal device.

18. The one or more computer-readable media according to claim 17, the acts further comprising determining whether the terminal device enters or leaves the regional range corresponding to the particular piece of information by comparing the positioning information with a corresponding regional range attribute of the particular piece of information.

19. The one or more computer-readable media according to claim 14, wherein determining the geographical location information of the terminal device comprises:
determining an Internet access mode of the terminal device;
determining identifier information of a wireless network if the Internet access mode is an Internet access via the wireless network; and
setting the identifier information of the wireless network as the geographical location information.

20. The one or more computer-readable media according to claim 19, further comprising:
determining whether the terminal device enters the regional range corresponding to the particular piece of information based on a respective wireless network identifier included in a corresponding regional range attribute of the particular piece of information; and
determining that the terminal device leaves the regional range corresponding to the particular piece of information in response to determining that the terminal device switches to another Internet access mode or another wireless network.

* * * * *